(12) United States Patent
Watson

(10) Patent No.: US 7,439,460 B1
(45) Date of Patent: Oct. 21, 2008

(54) VEHICLE WINDOW OPENING/CLOSING SWITCH APPARATUS

(75) Inventor: Stephen Watson, Wiltshire (GB)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/850,241

(22) Filed: Sep. 5, 2007

(51) Int. Cl.
*H01H 9/00* (2006.01)

(52) U.S. Cl. .................. 200/5 R; 200/6 A; 200/18; 200/4

(58) Field of Classification Search .............. 200/5 R, 200/4, 6 A, 17 R, 18; 341/20, 21, 35; 345/156, 345/157, 160, 161, 184
See application file for complete search history.

(56) References Cited

U.S. PATENT DOCUMENTS 6,396,006 B1 *  5/2002  Yokoji et al. ................. 200/4
7,214,894 B1 *  5/2007  Kakuno et al. ............... 200/6 A
7,262,375 B2 *  8/2007  Sakai .......................... 200/5 R
7,310,084 B2 * 12/2007  Shitanaka et al. ........... 345/156

FOREIGN PATENT DOCUMENTS

| DE | 199 62 789 | 7/2001 |
|----|------------|--------|
| WO | 2005/044631 | 5/2005 |

\* cited by examiner

*Primary Examiner*—Michael A Friedhofer
(74) *Attorney, Agent, or Firm*—Rankin, Hill & Clark LLP

(57) ABSTRACT

A vehicle window opening/closing switch apparatus for opening/closing a plurality of windows provided on a vehicle is disclosed. The apparatus has a first switch and a second switch. An arbitrary window can be electrically selected from among the windows by manually displacing the first switch to at least the left and right. The second switch is incorporated in the first switch and is capable of electrically opening/closing the window selected by the first switch by a manual operation.

7 Claims, 13 Drawing Sheets

USOO7439460B1

VEHICLE WINDOW OPENING/CLOSING SWITCH APPARATUS

FIELD OF THE INVENTION

The present invention relates to a vehicle window opening/closing switch apparatus for opening/closing multiple windows of a vehicle.

BACKGROUND OF THE INVENTION

In a common vehicle window opening/closing switch apparatus, multiple windows in a vehicle are opened and closed individually by multiple switches corresponding to the windows. Development aimed at reducing the price of window opening/closing switch apparatuses has recently been making progress, as disclosed, for example, in the international publication WO 2005/044631A.

The window opening/closing switch apparatus disclosed in the publication WO 2005/044631A is composed of a first switch and a second switch aligned on a panel. The following two operations are performed to open and close an arbitrary window in the vehicle. First, a single arbitrary window is selected from a plurality of windows by swingably operating a joystick of the first switch. Next, the selected window is opened and closed by slidably operating a knob of the second switch. As a result, the selected window is electrically opened or closed.

However, the window opening/closing switch apparatus disclosed in the publication WO2005/044631A has a configuration wherein the first and second switches aligned on the panel are mechanically or electrically linked to each other. Therefore, the window opening/closing switch apparatus is comparatively bulky and has a limited number of design options.

In view of this, there is a need for a technique whereby the vehicle window opening/closing switch apparatus can be reduced in size and provided with a larger number of design options.

SUMMARY OF THE INVENTION

According to the present invention, there is provided a vehicle window opening/closing switch apparatus for opening/closing a plurality of windows provided on a vehicle, the vehicle window opening/closing switch apparatus comprising: a first switch whereby an arbitrary window can be electrically selected from among the windows by a manual displacement of the switch to at least the left and right, and a second switch incorporated with the first switch and adapted to be manually operated to cause the selected window to be electrically opened and closed.

With the second switch for opening/closing the selected window being incorporated with the first switch for selecting an arbitrary window from multiple windows, a manual operation for selecting an arbitrary window from multiple windows and a manual operation for opening/closing the selected window can be performed continuously without taking the hand away from an operating member for operating the first and second switches. As a result, the vehicle window opening/closing switch apparatus is easier to operate. Furthermore, since the second switch is incorporated with the first switch, the vehicle window opening/closing switch apparatus can be made smaller in size in comparison with a configuration wherein the first and second switches are separate. Moreover, the vehicle window opening/closing switch apparatus can be provided with an increased number of design options.

Preferably, the first switch has individual designators that can be switched in order to select a single arbitrary window from among the windows, and multiple designators that can be switched in order to select two or more windows from among the windows.

In a preferred form, the individual designators are equal in number to the windows.

Desirably, the switch apparatus further comprises indicators corresponding at least to the individual designators.

The second switch preferably has an opening adjustment part that can be switched in order to arbitrarily adjust the amount by which the selected window is opened, an automatic fully opening part that can be switched in order to automatically move the selected window to the fully open position, and an automatic fully closing part that can be switched in order to automatically move the selected window to the fully closed position.

In a preferred form, the switch apparatus further comprises a third switch assembled with the first switch and designed to be electrically opened and closed by a manual operation in a direction opposite from directions of the manual operation of the first and second switches, while the third switch has at least one of an automatic full opening part and an automatic full closing part, the automatic full opening part being designed to be switched to automatically move one of the selected windows to a fully open position, the automatic full closing part being designed to be switched automatically move one of the selected windows to a fully closed position, and the second switch has opening adjustment parts capable of being switched to arbitrarily adjust the amount by which one of the selected windows is opened.

Furthermore, the switch apparatus preferably further comprises other switches electrically independent of the first and second switches at positions adjacent to the first and second switches, wherein the other switches are configured to operate vehicle load structures other than the windows.

BRIEF DESCRIPTION OF THE ACCOMPANYING DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
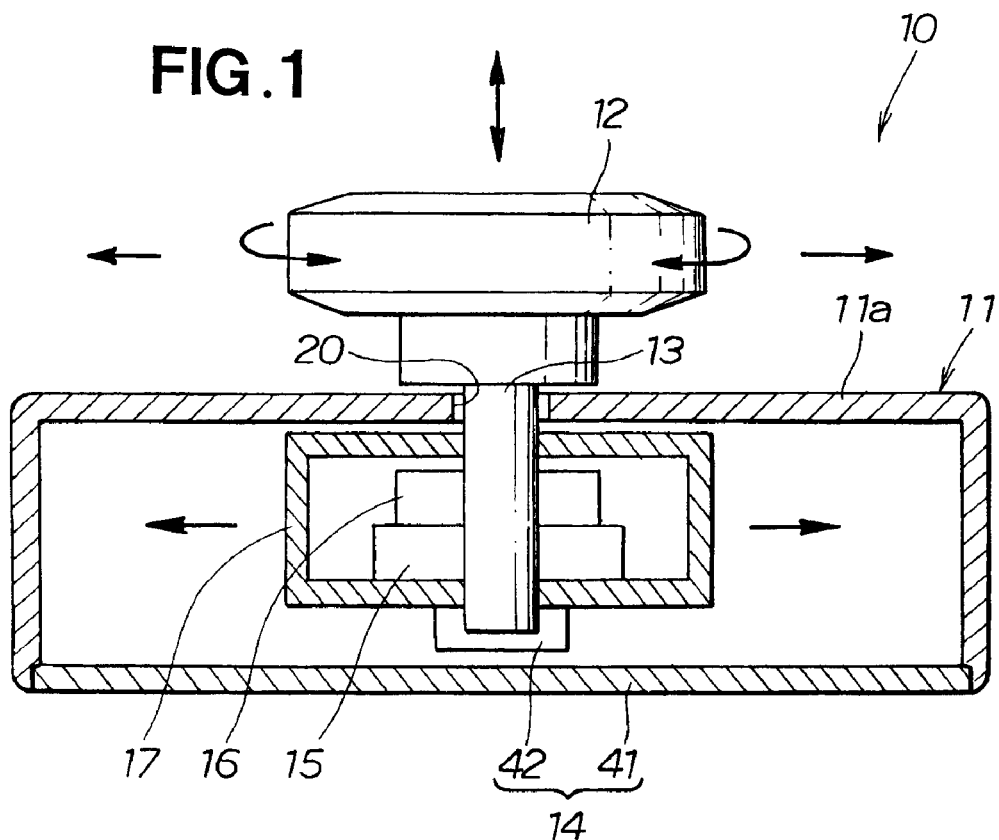
FIG. 1 is a cross-sectional view schematically showing a vehicle window opening/closing switch apparatus according to the present invention.

As shown in FIG. 1, a vehicle window opening/closing switch apparatus 10 is composed of a switch case 11, an operating member 12 (knob 12), an operating shaft 13, a first switch 14, a second switch 15, a third switch 16, and a switch-incorporating unit 17. The switch-incorporating unit 17 is a member for incorporating the second switch 15 and the third switch 16 with the first switch 14. Since the second and third switches 15 and 16 are incorporated with the first switch 14, the window opening/closing switch apparatus 10 can be reduced in size in comparison with a configuration wherein the first, second, and third switches 14 through 16 are separated from each other. Moreover, the window opening/closing switch apparatus 10 has an increased number of design options and is mounted, e.g., in an appropriate position in the vehicle cabin (for example, the dashboard, or the armrest in the door on the driver side).

Figure 2:
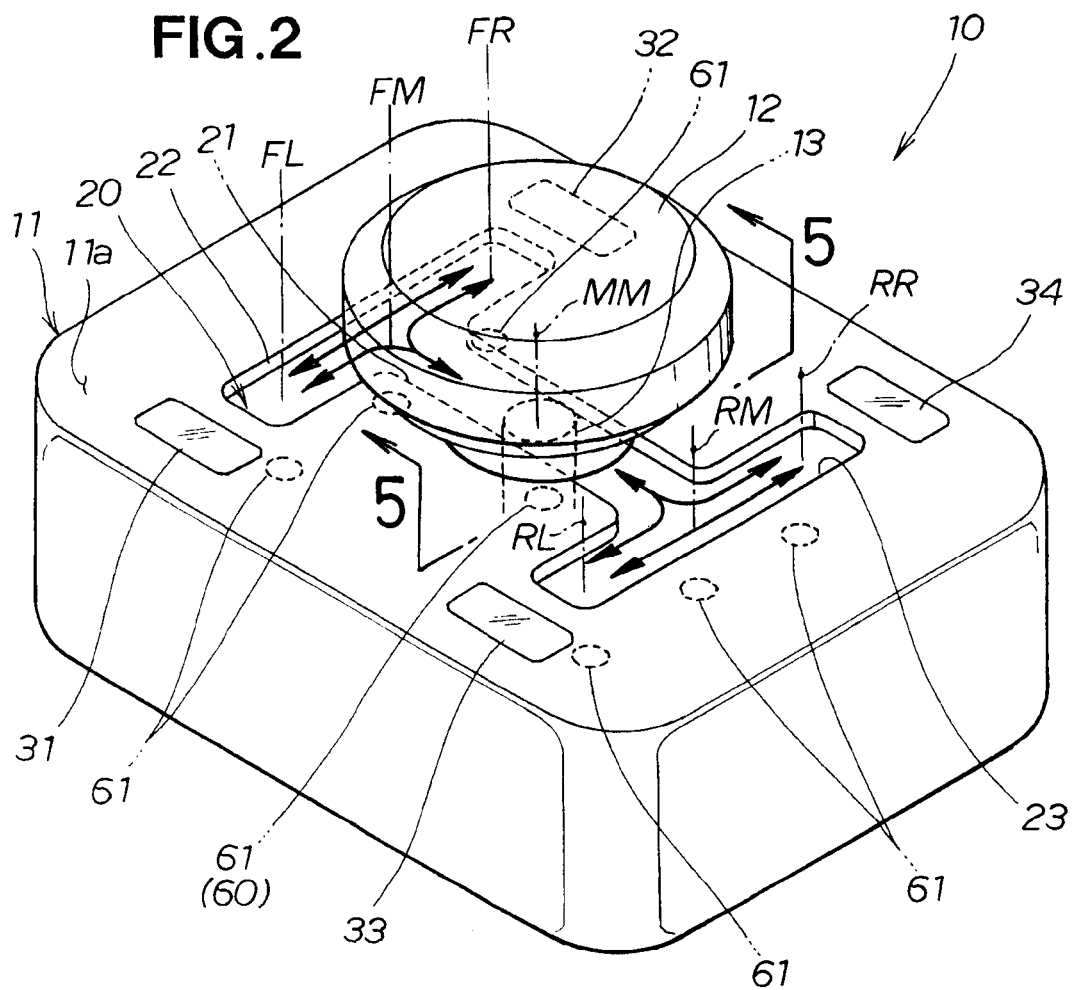
FIG. 2 is a perspective view of the vehicle window opening/closing switch apparatus shown in FIG. 1.

As shown in FIGS. 1 and 2, the switch case 11 has a guiding groove 20 roughly in the shape of an I-beam (in other words, the shape of an H turned sideways) formed on a flat plate-shaped operating plate 11a for guiding the operating shaft 13. The guiding groove 20 passes through the switch case 11, and is composed of one long, thin linear longitudinal groove 21, and two long, thin linear transverse grooves 22, 23 extending substantially at right angles to the longitudinal groove 21, as seen when the operating plate 11a is viewed. The first transverse groove 22 is communicated with one end of the longitudinal groove 21, and extends uniformly to the left and right from the end of the longitudinal groove 21. The second transverse groove 23 is communicated with the other end of the longitudinal groove 21, and extends uniformly to the left and right from the other end of the longitudinal groove 21. The switch case 11 is disposed so that the first end of the longitudinal groove 21 faces toward the front or top of the vehicle. The longitudinal direction of the longitudinal groove 21 (the direction of the ends) is hereinafter referred to as the front-back direction. The longitudinal direction of the first transverse groove 22 and the second transverse groove 23 (the direction of the ends) is referred to as the left-right direction.

Figure 3:
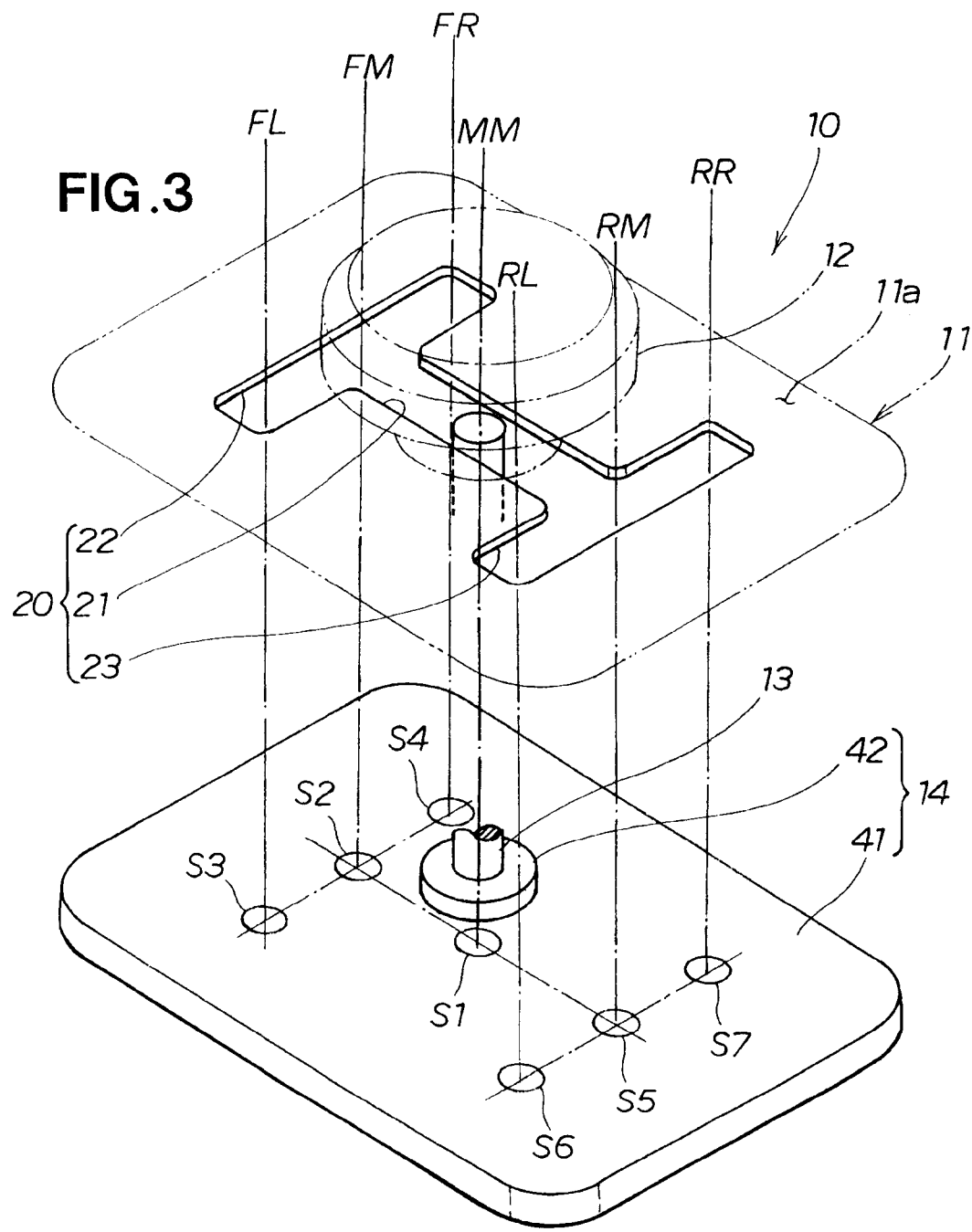
FIG. 3 is a perspective view schematically showing a first switch shown in FIGS. 1 and 2.

As shown in FIGS. 2 and 3, the specific positions in the guiding groove 20 as seen when the operating plate 11a is viewed are defined as follows. The middle position in the longitudinal groove 21 is the middle position MM. The middle position in the first transverse groove 22 is the front middle position FM. The left end position in the first transverse groove 22 is the front left position FL. The right end position in the first transverse groove 22 is the front right position FR. The middle position in the second transverse groove 23 is the rear middle position RM. The left end position in the second transverse groove 23 is the rear left position RL. The right end position in the second transverse groove 23 is the rear right position RR.

The operating shaft 13 is inserted into the guiding groove 20. Therefore, the operating shaft 13 is capable of moving along the guiding groove 20. More specifically, the operating shaft 13 is capable of moving forwards and backwards along the longitudinal groove 21, moving from one end of the longitudinal groove 21 into the first transverse groove 22 and to the left and right along the first transverse groove 22, and moving from the other end of the longitudinal groove 21 into the second transverse groove 23 and to the left and right along the second transverse groove 23. Furthermore, the operating shaft 13 is capable of rotating and moving in the axial direction in relation to the guiding groove 20. A knob 12 is fixed to one end of the operating shaft 13.

As shown in FIG. 2, the window opening/closing switch apparatus 10 has indicators 31 through 34 on the operating plate 11a. The indicator 31 disposed in the front left of the operating plate 11a corresponds to the front left position FL. The indicator 32 disposed on the front right of the operating plate 11a corresponds to the front right position FR. The indicator 33 disposed on the rear left of the operating plate 11a corresponds to the rear left position RL. The indicator 34 disposed on the rear right of the operating plate 11a corresponds to the rear right position RR.

As shown in FIGS. 1 and 3, the first switch 14 is linked to the operating shaft 13, and is composed of a sliding switch that is capable of sliding in numerous specific directions along the guiding groove 20 inside the switch case 11. More specifically, the first switch 14 is composed of, e.g., a flat plate-shaped fixed member 41 fixed in place on the bottom of the switch case 11, and a movable member 42 disposed facing the fixed member 41 and linked to the other end of the operating shaft 13.

As shown in FIG. 3, the fixed member 41 has detectors S1 through S7 for detecting the position of the operating shaft 13 and movable member 42. The middle detector S1 detects that the operating shaft 13 (including the movable member 42) has been placed in the middle position MM. The front middle detector S2 detects that the operating shaft 13 has been placed in the front middle position FM. The front left detector S3 detects that the operating shaft 13 has been placed in the front left position FL. The front right detector S4 detects that the operating shaft 13 has been placed in the front right position FR. The rear middle detector S5 detects that the operating shaft 13 has been placed in the rear middle position RM. The rear left detector S6 detects that the operating shaft 13 has been placed in the rear left position RL. The rear right detector S7 detects that the operating shaft 13 has been placed in the rear right position RR.

The front left detector S3, the front right detector S4, the rear left detector S6, and the rear right detector S7 are hereinafter referred to appropriately as "individual designators." The middle detector S1, the front middle detector S2, and the rear middle detector S5 are referred to appropriately as "multiple designators."

Figure 4:
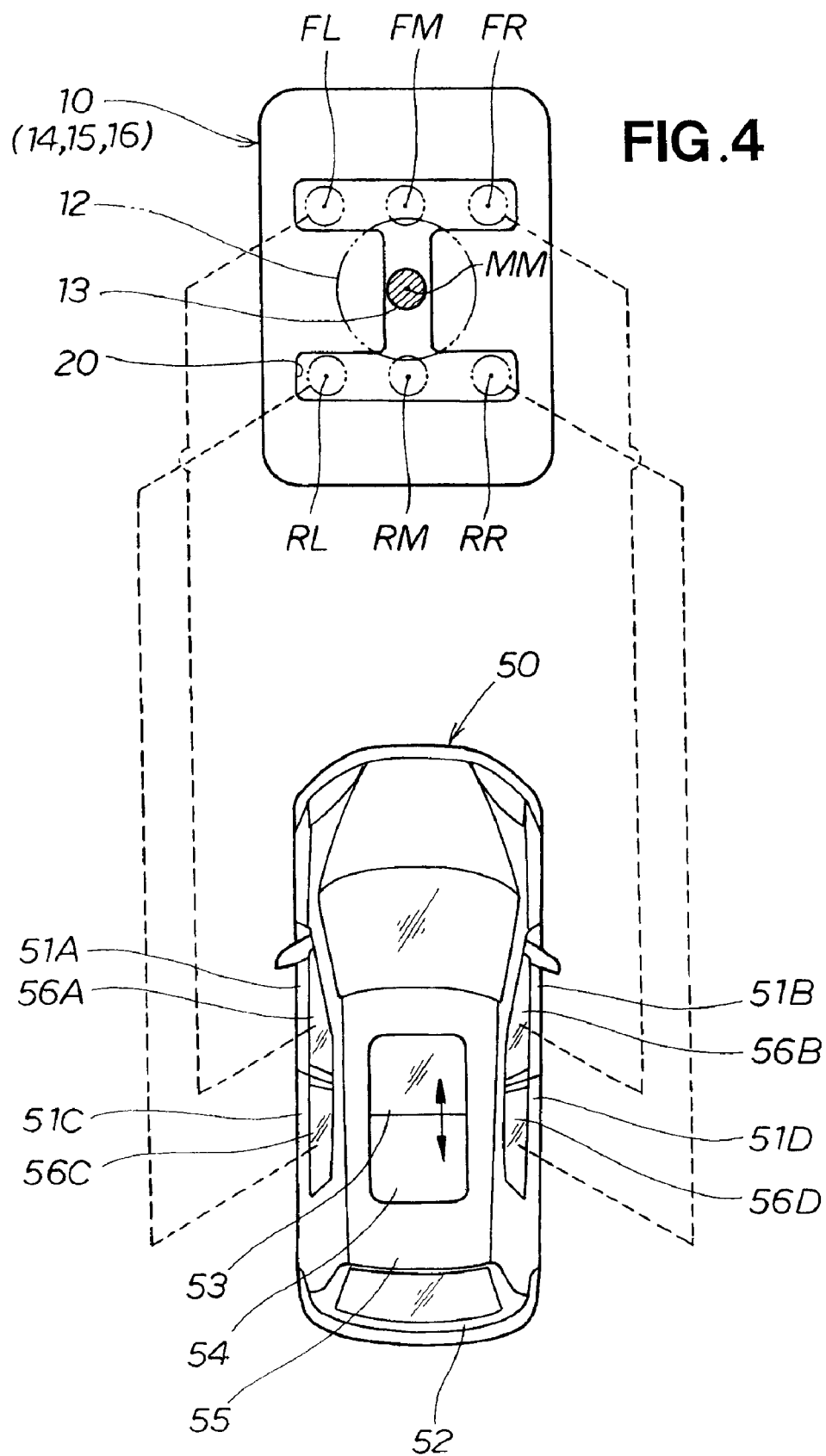
FIG. 4 is an explanatory diagram schematically illustrating the relationship between the vehicle window opening/closing switch apparatus and the vehicle windows operated by the vehicle window opening/closing switch apparatus.

FIG. 4 shows the relationship of the vehicle windows 56A through 56D operated by the window opening/closing switch apparatus 10. FIG. 4 shows a vehicle 50 in reduced schematic form as seen from above. The vehicle 50 comprises four side doors 51A through 51D, a rear tailgate 52 (rear door 52), a sunroof 53, and a sunshade 54. The sunroof 53 and the sunshade 54 are provided to be capable of opening/closing forwards and backwards in relation to the roof 55 of the vehicle 50. The sunroof 53 is a member for opening/closing an opening in the roof 55, and can therefore be considered to be one of the windows provided to the vehicle 50.

The doors 51A through 51D respectively have side windows 56A through 56D that are capable of vertically opening/closing. The side window 56A in the front left side door 51A is referred to as the front left window 56A. The side window 56B in the front right side door 51B is referred to as the front right window 56B. The side window 56C in the rear left side door 51C is referred to as the rear left window 56C. The side window 56D in the rear right side door 51D is referred to as the rear right window 56D.

In the window opening/closing switch apparatus 10, the front left position FL corresponds to the front left window 56A, the front right position FR corresponds to the front right window 56B, the rear left position RL corresponds to the rear left window 56C, and the rear right position RR corresponds to the rear right window 56D.

Figure 5:
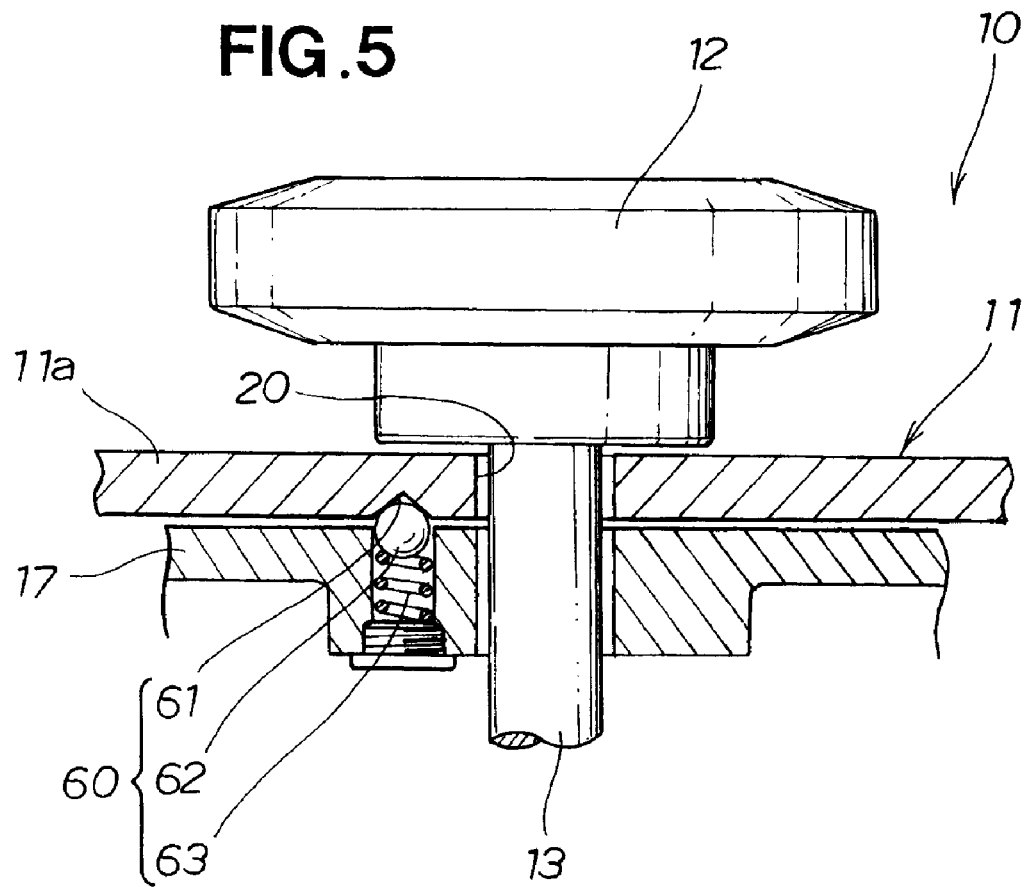
FIG. 5 is a cross-sectional view along the line 5-5 in FIG. 2.

As shown in FIGS. 2 and 5, the window opening/closing switch apparatus 10 has a click mechanism 60 that is capable of providing a clear click sound and a clear sense of operation when the knob has been slid to a new position. The click sound and the sense of operation are produced when the operating shaft 13 reaches the seven positions MM, FM, FL, FR, RM, RL, RR set in the guiding groove 20.

The click mechanism 60 is composed of, e.g., seven concavities 61, one ball 62, and one spring 63. The seven concavities 61 are formed on the reverse surface of the operating plate 11*a* in accordance with the seven positions MM, FM, FL, FR, RM, RL, RR. The ball 62 is a member that can be separately placed in and removed from the seven concavities 61. The spring 63 is an urging member for urging the ball 62 against the reverse surface of the operating plate 11*a*. For example, when the knob 12 positioned at the middle position MM is slid forwards into the front middle position FM, the ball fits into the concavity 61 that corresponds to the front middle position FM. At this moment, the click mechanism 60 produces a clear click sound. The person operating the knob 12 hears the clear click sound and experiences a clear sense of operation.

Figure 6:
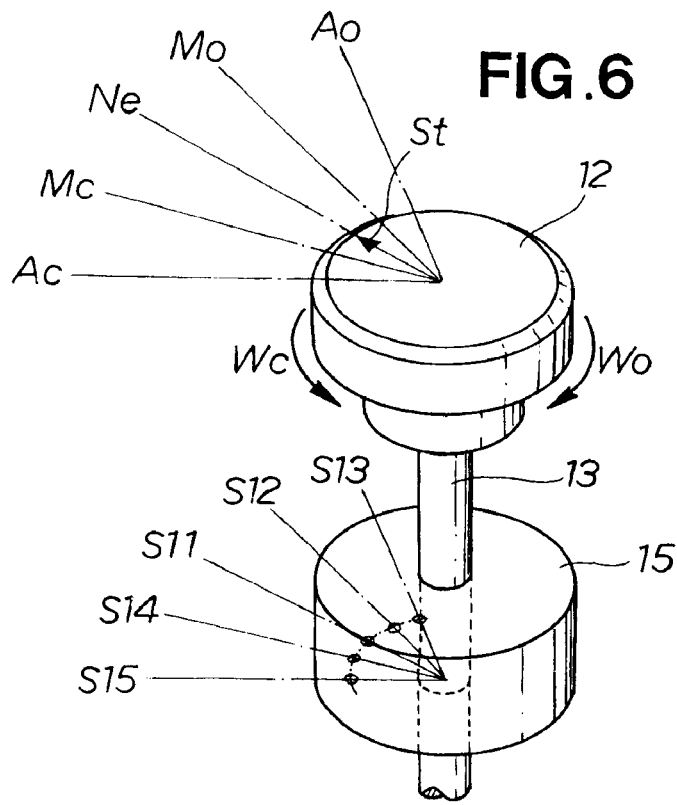
FIG. 6 is a perspective view schematically illustrating the second switch shown in FIG. 1.

As can be seen from FIGS. 1 and 6, the knob 12 and the operating shaft 13 together serve as an operating member for manually operating the second switch 15. The knob 12 has a reference mark or sign St that serves as a rotational position reference. When the knob 12 is in a neutral state, the neutral rotational position Ne coincides with the position of the reference mark St. In its clockwise rotational operation as shown by arrow Wo, the knob 12 can be turned up until an automatic fully open position Ao. Provided between the neutral rotational position Ne and the automatic fully open position Ao is a window opening adjustment position Mo. In its counterclockwise rotational operation as shown by arrow Wc, the knob 12 can be turned up until an automatic fully closed position Ac. Between the neutral rotational position Ne and the automatic fully closed position Ac, there is provided a window closing adjustment position Mc.

The second switch 15 has a click mechanism and an auto-return mechanism, neither of which is illustrated. The click mechanism has the same configuration as the click mechanism shown in FIG. 5, and is capable of providing a clear click sound and a clear sense of operation when the knob 12 is rotated to a new position. The auto-return mechanism is capable of automatically returning the knob 12 and operating shaft 13 to the neutral rotational position Ne when the knob 12 is rotated by hand and then the hand is removed.

Furthermore, the second switch 15 is composed of a rotary switch that is rotatably operated by the knob 12 via the operating shaft 13. The second switch 15 has a neutral rotation part S11, an opening adjustment part S12 for opening the window (window-opening-degree adjustment part), an automatic fully opening part S13, an opening adjustment part S14 for closing the window (window-closing-degree adjustment part), and an automatic fully closing part S15. The neutral rotation part S11 detects that the knob 12 has been placed in the neutral rotational position Ne and generates a neutral signal. The opening adjustment part S12 for opening the window detects that the knob 12 has been placed in the window adjustment position Mo for opening the window and generates an opening window adjustment signal. The automatic fully opening part S13 detects that the knob 12 has been placed in the automatic fully open position Ao and generates an automatic full opening signal. The opening adjustment part S14 for closing the window detects that the knob 12 has been placed in the window adjustment position Mc for closing the window and generates a closing window adjustment signal. The automatic fully closing part S15 detects that the knob 12 has been placed in the automatic fully closed position Ac and generates an automatic full closure signal.

Figure 7:
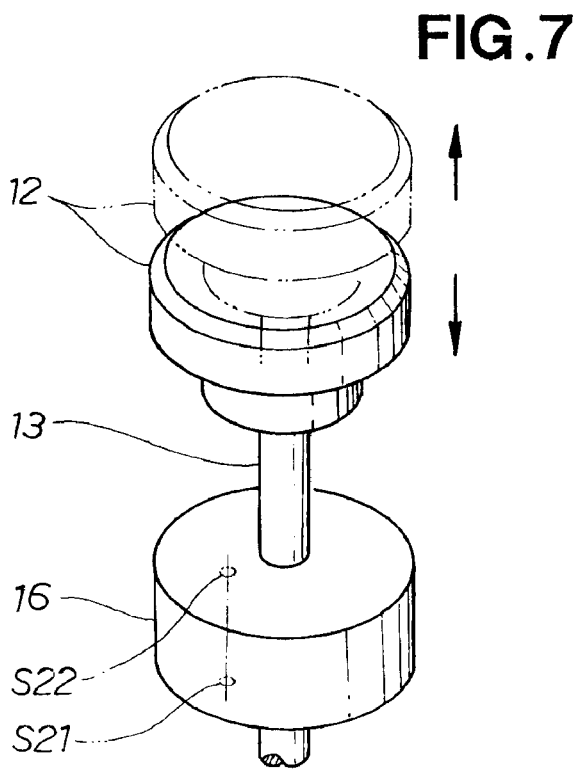
FIG. 7 is a perspective view schematically illustrating a third switch shown in FIG. 1.

As shown in FIGS. 1 and 7, the knob 12 and the operating shaft 13 can together serve as an operating member for manually operating the third switch 16. When combined in this manner, the knob 12 can be configured so as to be capable of self-maintaining the desired operating position when pushed in or pulled out.

The third switch 16 is comprised of a push-pull switch that is pushed and pulled by the knob 12 via the operating shaft 13. Namely, the third switch 16 is manually operated in a direction different from directions of manual operation of the first and second switches 14, 15 to effect the required electric window opening/closing. The third switch 16 has an automatic full opening part S21 and an automatic full closing part S22. When the knob 12 is push-operated, the automatic full opening part S21 detects the push-operation and generates a push-operation signal (automatic full opening signal). When the knob 12 is pull-operated, the automatic full closing part S22 detects the pull-operation and generates a pull-operation signal (automatic full closure signal).

The automatic full opening signal generated by the second switch 15 and the automatic full opening signal generated by the third switch 16 are both operation signals for automatically moving the selected window to the fully open position. The automatic full closure signal generated by the second switch 15 and the automatic full closure signal generated by the third switch 16 are both operation signals for automatically moving the selected window to the fully closed position. Therefore, the inclusion of the third switch 16 is arbitrary. Also, the second switch 15 may be configured without the automatic fully opening part S13 and the automatic fully closing part S15 in cases in which the third switch 16 is provided to the window opening/closing switch apparatus 10.

Figure 8:
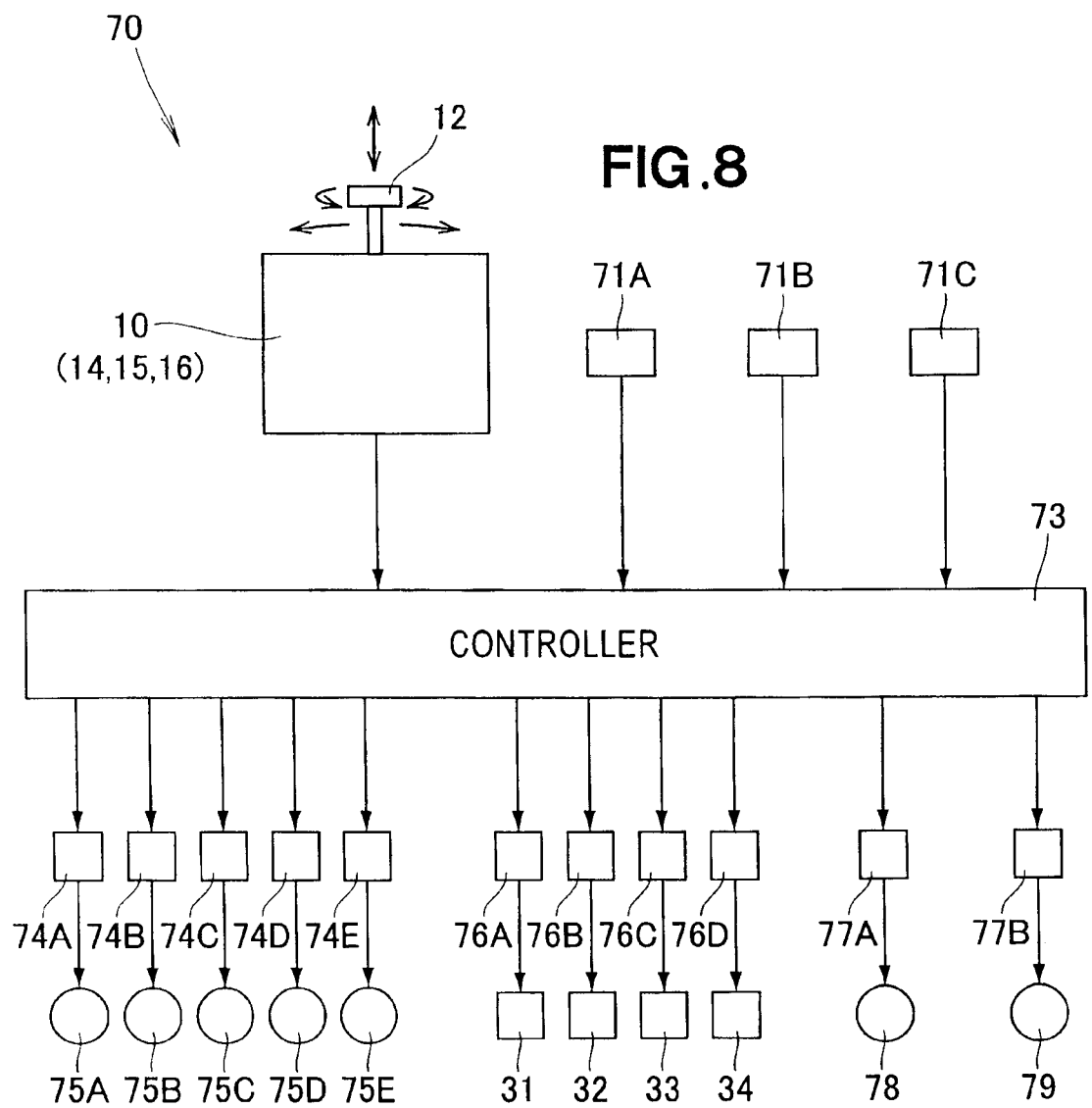
FIG. 8 is a block diagram of a control system incorporating the vehicle window opening/closing switch apparatus shown in FIG. 1.

FIG. 8 shows a control system 70 in which the window opening/closing switch apparatus 10 is incorporated. The control system 70 is composed of the window opening/closing switch apparatus 10, a sunroof switch 71A, a sunshade switch 71B, a tailgate switch 71C, a controller 73, motor drivers 74A through 74E, window motors 75A through 75E, indicator drivers 76A through 76D, indicators 31 through 34, load drivers 77A and 77B, a sunshade motor 78, and a tailgate solenoid 79.

As shown in FIGS. 4 and 8, the controller 73 controls the four window motors 75A through 75D via the four motor drivers 74A through 74D, and controls the four indicators 31 through 34 via the four indicator drivers 76A through 76D, on the basis of switch signals of the window opening/closing switch apparatus 10. The first window motor 75A drives the front left window 56A to open and close the window. The second window motor 75B drives the front right window 56B to open and close the window. The third window motor 75C drives the rear left window 56C to open and close the window. The fourth window motor 75D drives the rear right window 56D to open and close the window.

Furthermore, the controller 73 controls the sunroof motor 75E via the motor driver 74E on the basis of a switch signal of the sunroof switch 71A. The sunroof motor 75E drives the sunroof 53 to open and close the sunroof (see FIG. 4). Furthermore, the controller 73 controls the sunshade motor 78 via the load driver 77A on the basis of a switch signal of the sunshade switch 71B. The sunshade motor 78 drives the sunshade 54 to open and close the sunshade (see FIG. 4). Furthermore, the controller 73 controls the tailgate solenoid 79 via the load driver 77B on the basis of a switch signal of the tailgate switch 71C. The tailgate solenoid 79 drives a latch of the tailgate 52 (see FIG. 4) to engage and release the latch.

Next, the operation of the window opening/closing switch apparatus 10 and of the control system 70 will be described.

First, the operation of the first switch 14 will be described. As shown in FIGS. 2, 3, and 4, all four of the windows 56A through 56D are selected by the first switch 14 when the operating shaft 13 (including the knob 12) is in the middle position MM. At this time, all four of the indicators 31 through 34 light up, indicating that all of the windows 56A through 56D have been selected.

The front left window 56A and the front right window 56B are selected with the first switch 14 by operating the knob 12 when the operating shaft 13 is in the front middle position FM. At this time, the front left and front right indicators 31 and 32 light up, indicating that the two front windows 56A and 56B have been selected.

The first switch 14 selects the front left window 56A when the operating shaft 13 is in the front left position FL. At this time, the front left indicator 31 lights up, indicating that the front left window 56A has been selected.

The first switch 14 selects the front right window 56B when the operating shaft 13 is in the front right position FR. At this time, the front right indicator 32 lights up, indicating that the front right window 56B has been selected.

The first switch 14 selects the rear left window 56C and the rear right window 56D when the operating shaft 13 is in the rear middle position RM. At this time, the rear left and rear right indicators 33 and 34 light up, indicating that the two rear windows 56C and 56D have been selected.

The first switch 14 selects the rear left window 56C when the operating shaft 13 is in the rear left position RL. At this time, the rear left indicator 33 lights up, indicating that the rear left window 56C has been selected.

The first switch 14 selects the rear right window 56D when the operating shaft 13 is in the rear right position RR. At this time, the rear right indicator 34 lights up, indicating that the rear right window 56D has been selected.

Next, the operation of the second switch 15 will be described. For example, as shown in FIGS. 4, 6, and 8, the knob 12 is rotatably operated in the clockwise direction Wo from the neutral rotational position Ne to the window opening adjustment position Mo. At this time, the controller 73 performs control so as to normally rotate one of the window motors 75A through 75D that corresponds to the window selected from among the windows 56A through 56D by the first switch 14. The controller rotates this window motor for the time period Tm that the knob 12 is held by hand in the window adjustment position Mo for opening the window. The window motor corresponding to the selected window openably drives the selected window for the time period Tm. The windows are opened and closed at a substantially constant speed. The amount by which the window is opened is proportionate to the time period Tm. Releasing the hand from the knob 12 causes the knob 12 and operating shaft 13 to automatically return to the neutral rotational position Ne.

The knob 12 is then rotated in the clockwise direction Wo from the neutral rotational position Ne to the automatic fully open position Ao, and the hand is removed from the knob 12. The knob 12 and the operating shaft 13 automatically return to the neutral rotational position Ne. When the knob 12 has been temporarily operated to the automatic fully open position Ao, the controller 73 performs control so as to normally rotate one of the window motors 75A through 75D that corresponds to the window selected from among the windows 56A through 56D by the first switch 14. As a result, the window fully opens. When the window has fully opened, the controller 73 stops the window motor 75A through 75D.

When the knob 12 has been rotatably operated in the counterclockwise direction Wc from the neutral rotational position Ne, the controller 73 either adjusts the amount by which the window is opened or fully closes the window by performing control so as to close the selected window, similar to when the knob is turned in the clockwise direction Wo.

As is made clear in the above descriptions, the opening adjustment parts S12 and S14 are components that can be switched in order to arbitrarily adjust the amount by which the selected window is opened. The automatic fully opening part S13 is a component that can be switched in order to automatically move the selected window to the fully open position. The automatic fully closing part S15 is a component that can be switched in order to automatically move the selected window to the fully closed position. Therefore, it is possible to easily select a single arbitrary part from the opening adjustment parts S12 and S14, the automatic fully opening part S13, and the automatic fully closing part S15 by operating the second switch 15. Accordingly, the window selected by the first switch 14 (see FIG. 1) can be easily adjusted in terms of the amount by which the window is opened, and the window can also be automatically fully opened or automatically fully closed.

Next, the operation of the third switch 16 will be described with reference to FIGS. 7 and 8. When the knob 12 is pushed in, the third switch 16 generates an automatic full opening signal. The controller 73 automatically moves the selected window to the fully open position, similar to when the knob 12 is rotatably operated to the automatic fully open position Ao (see FIG. 6). When the knob 12 is pulled out, the third switch 16 generates an automatic full closure signal. The controller 73 automatically moves the selected window to the fully closed position, similar to when the knob 12 is rotatably operated to the automatic fully closed position Ac (see FIG. 6).

The following is a summary of the example shown in FIGS. 1 through 8. The window opening/closing switch apparatus 10 is an apparatus for openably and closably operating the windows 56A through 56D provided to the vehicle 50, and comprises the first switch 14, and the second and third switches 15 and 16 incorporated in the first switch 14. The first switch 14 can electrically select an arbitrary window from among the windows 56A through 56D by being displaced at least to the left and right by means of a manual operation. The second and third switches 15 and 16 can electrically open and close the selected window by means of a manual operation. The knob 12 and the operating shaft 13 of the first switch 14 together serve as an operating member for manually operating the second and third switches 15, 16.

Therefore, an occupant of the vehicle 50 can continuously perform the manual operation for selecting an arbitrary window form the windows 56A through 56D and the manual operation for opening/closing the selected window, without releasing his or her hand from the knob 12 provided to the first, second, and third switches 14 through 16. As a result, the window opening/closing switch apparatus 10 is easier to operate. Furthermore, since the second and third switches 15 and 16 are incorporated in the first switch 14, the window opening/closing switch apparatus 10 can be reduced in size in comparison with a configuration in which the first, second, and third switches 14 through 16 are separate. Moreover, the window opening/closing switch apparatus 10 can be provided with an increased number of design options.

The first switch 14 also has individual designators S3, S4, S6, S7 and multiple designators S1, S2, S5. The individual designators S3, S4, S6, S7 are components that can be switched in order to select a single arbitrary window from among the windows 56A through 56D. Therefore, a single arbitrary window can be easily and reliably selected from among the windows 56A through 56D by selecting one of the individual designators S3, S4, S6, S7 and merely switching the position of the knob 12 and operating shaft 13. The multiple designators S1, S2, S5 are components that can be switched in order to select two or more arbitrary windows from the windows 56A through 56D. Therefore, two or more arbitrary windows can be easily and reliably selected from among the windows 56A through 56D by selecting one of the multiple designators S1, S2, S5 and merely switching the position of the knob 12 and operating shaft 13.

The number of individual designators S3, S4, S6, S7 is the same as the number of windows 56A through 56D. Therefore, it is easy to select a single arbitrary window from among the windows 56A through 56D.

The indicators 31 through 34 correspond on a one-to-one basis at least to the individual designators S3, S4, S6, S7. Therefore, when a single arbitrary window is selected from among the windows 56A through 56D, the selected window can easily be confirmed by viewing the indicators 31 through 34. Accordingly, when the wrong window is selected, the selection can quickly be changed, and the window opening/closing switch apparatus 10 can therefore be more easily operated.

Next, modifications of the window opening/closing switch apparatus 10 will be described with reference to FIGS. 9 through 16. Elements similar to those in the window opening/closing switch apparatus 10 shown in FIGS. 1 through 8 are denoted by the same numerical symbols and are not described.

Figure 9:
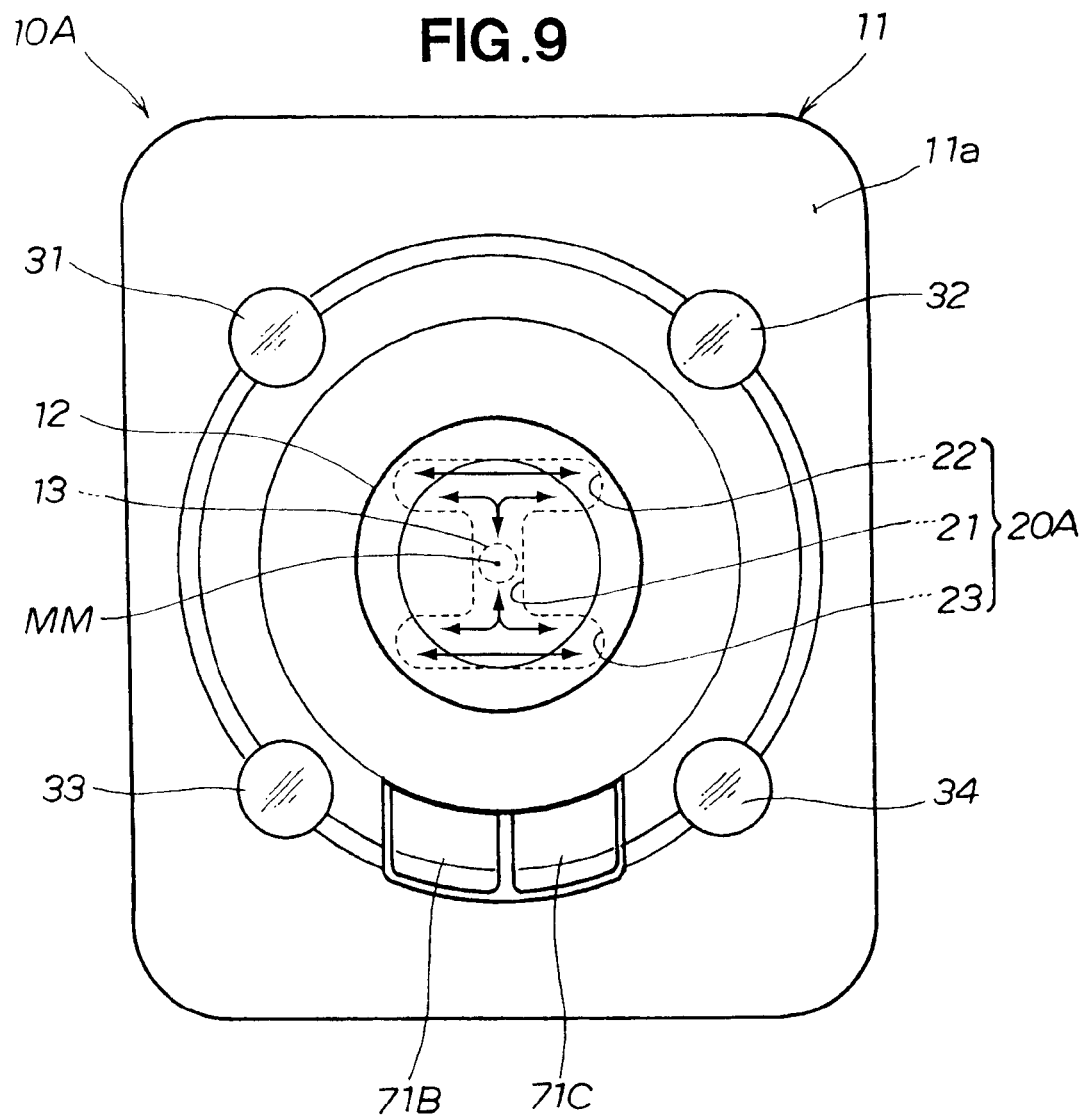
FIG. 9 is a plan view of the first modification of the vehicle window opening/closing switch apparatus shown in FIG. 2.

A window opening/closing switch apparatus 10A of the first modification as shown in FIG. 9 has substantially the same configuration as the window opening/closing switch apparatus 10 shown in FIGS. 1 through 8. A guiding groove 20A of the first modification is smaller than the guiding groove in the embodiment described above. Therefore, the guiding groove 20A is entirely covered by the knob 12 when the operating shaft 13 is in the middle position MM. Accordingly, the outward appearance of the window opening/closing switch apparatus 10A is further improved.

In the window opening/closing switch apparatus 10A of the first modification, the shapes and arrangement of the indicators 31 through 34 are varied in relation to the window opening/closing switch apparatus 10. The indicators 31 through 34 are roughly circular in shape.

In the window opening/closing switch apparatus 10A of the first modification, the other switches (e.g., the sunshade switch 71B and the tailgate switch 71C shown in FIG. 8) are provided to the operating plate 11a of the switch case 11. The other switches 71B and 71C are disposed on the operating plate 11a, are adjacent to the first, second, and third switches 14 through 16 (see FIG. 1), and are composed of, e.g., a seesaw switch (also referred to as a "tumbler switch" or a "rocker switch"). The other switches 71B and 71C are electrically independent of the first, second, and third switches 14 through 16, and the other switches operate vehicle loads (e.g., the sunshade 54 and the rear tailgate 52 shown in FIG. 4) other than the windows 56A through 56D. Thus, the other switches 71B and 71C are arranged more compactly at the position of the first, second, and third switches 14 through 16. Therefore, the other switches 71B and 71C adjacent to the first, second, and third switches 14 through 16 can easily be operated while the switches 14 through 16 are operated.

Figure 10:
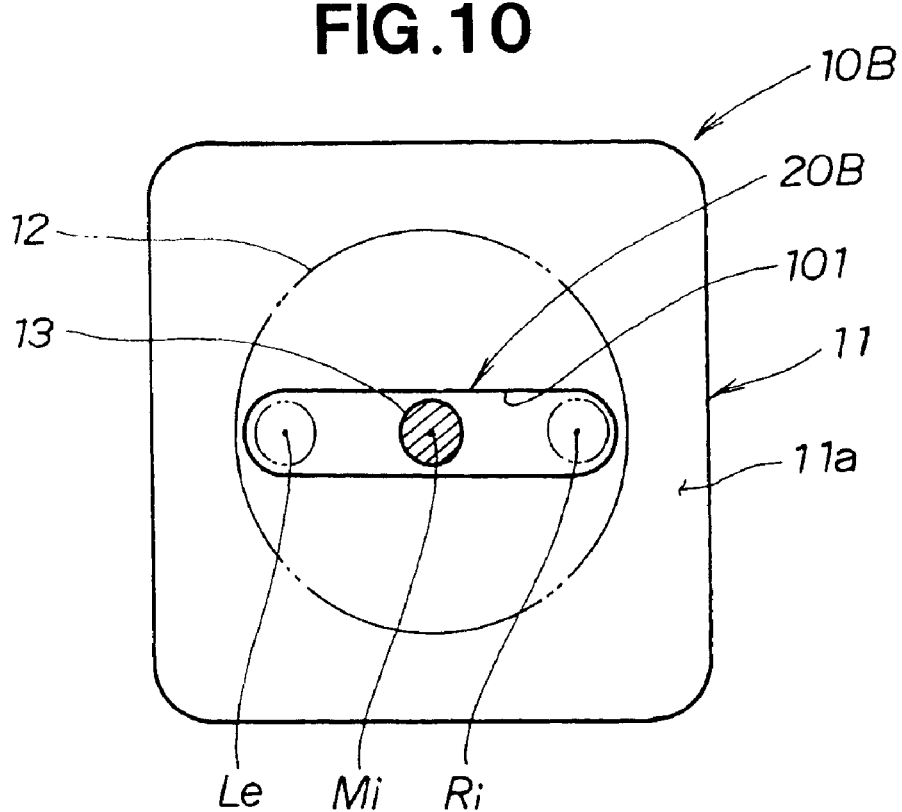
FIG. 10 is a plan view schematically illustrating the second modification of the vehicle window opening/closing switch apparatus shown in FIG. 2.

A window opening/closing switch apparatus 10B of the second modification shown in FIG. 10 is applied to a so-called two-door vehicle, which is a vehicle comprising two left and right side doors. The two doors may, for example, be the front left side door 51A having the front left window 56A, and the front right side door 51B having the front right window 56B, both of which are shown in FIG. 4.

A guiding groove 20B of the second modification is composed merely of a transverse groove 101 formed in a straight line from left to right. An arbitrary window can be selected from among the windows 56A and 56B (see FIG. 4) by displacing the operating shaft 13 to the left and right in the guiding groove 20B; i.e., by displacing the first switch 14 (see FIG. 1) to the left and right. The first switch 14 selects both the left and right windows 56A and 56B when the operating shaft 13 is in the middle position Mi of the guiding groove 20B, the first switch selects the left window 56A when the operating shaft 13 is in the left position Le of the guiding groove 20B, and the first switch selects the right window 56B when the operating shaft 13 is in the right position Ri of the guiding groove 20B. The other elements in the window opening/closing switch apparatus 10B of the second modification are substantially the same as those in the window opening/closing switch apparatus 10 shown in FIGS. 1 through 8.

Figure 11:
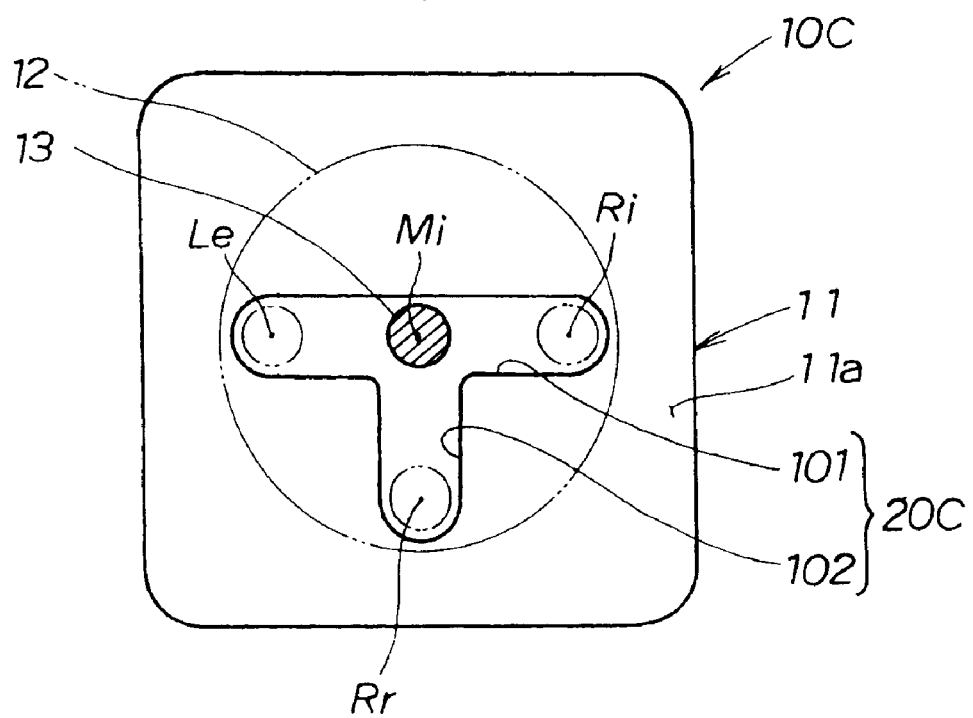
FIG. 11 is a plan view schematically illustrating the third modification of the vehicle window opening/closing switch apparatus shown in FIG. 2.

A window opening/closing switch apparatus 10C of the third modification shown in FIG. 11 is a further modification from the second modification shown in FIG. 10. The window opening/closing switch apparatus 10C of the third modification is applied to a two-door vehicle comprising two left and right side doors and a sunroof. The two side doors may, for example, be the front left side door 51A having the front left window 56A, and the front right side door 51B having the front right window 56B, both of which are shown in FIG. 4, in the same manner as in the second modification. The sunroof may be the sunroof 53 shown in FIG. 4.

The window opening/closing switch apparatus 10C of the third modification fulfills the role of the sunroof switch 71A shown in FIG. 8. The guiding groove 20C of the third modification is formed into a rough T shape, and is composed of a transverse groove 101 formed in a straight line from left to right, and a longitudinal groove 102 communicated at one end with the middle position Mi of the transverse groove 101. An arbitrary window can be selected from the left and right windows 56A and 56B by displacing the operating shaft 13 to the left and right in the guiding groove 20C. The sunroof 53 (see FIG. 4) can be selected by positioning the operating shaft 13 in the rear position Rr of the guiding groove 20C. Thus, an arbitrary window can be electrically selected from among the windows 56A, 56B, and 53 by displacing the first switch 14 (see FIG. 1) of the third modification at least to the left and right by means of a manual operation. The other elements in the window opening/closing switch apparatus 10C are substantially the same as those in the second modification shown in FIG. 10.

With the window opening/closing switch apparatus 10C of the third modification, the first switch 14 can be operated to select the sunroof 53 (window 53), and the second switch 15 or third switch 16 can then be operated to adjust the amount by which the sunroof 53 is opened, to automatically fully open the sunroof, or to automatically fully close the sunroof.

Figure 12:
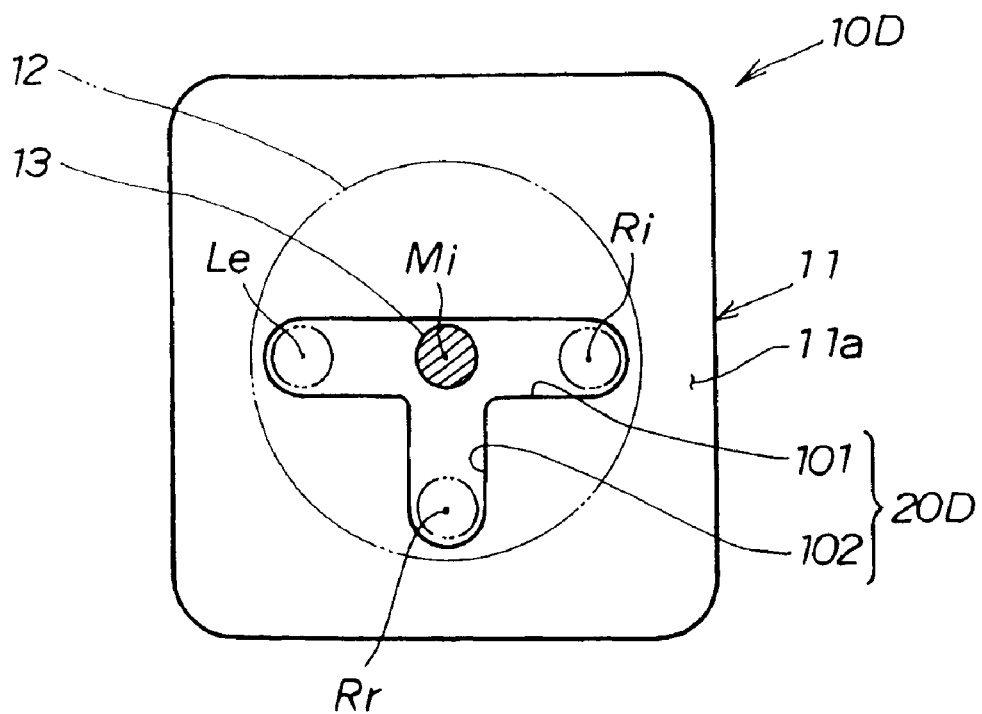
FIG. 12 is a plan view schematically illustrating the fourth modification of the vehicle window opening/closing switch apparatus shown in FIG. 2.

A window opening/closing switch apparatus 10D of the fourth modification shown in FIG. 12 is a further modification of the third modification shown in FIG. 11. The window opening/closing switch apparatus 10D of the fourth modification has a configuration wherein only the two left and right windows 56A and 56B shown in FIG. 4 are selected to be opened or closed. A guiding groove 20D of the fourth modification is formed into a rough T shape, similar to the third modification. In the fourth modification, the first switch 14 (see FIG. 1) does not make a selection when the operating shaft 13 is in the rear position Rr of the guiding groove 20D. In other words, the first switch 14 is off. Therefore, the operation of the second and third switches 15 and 16 does not affect the action of the windows 56A and 56B.

Figure 13:
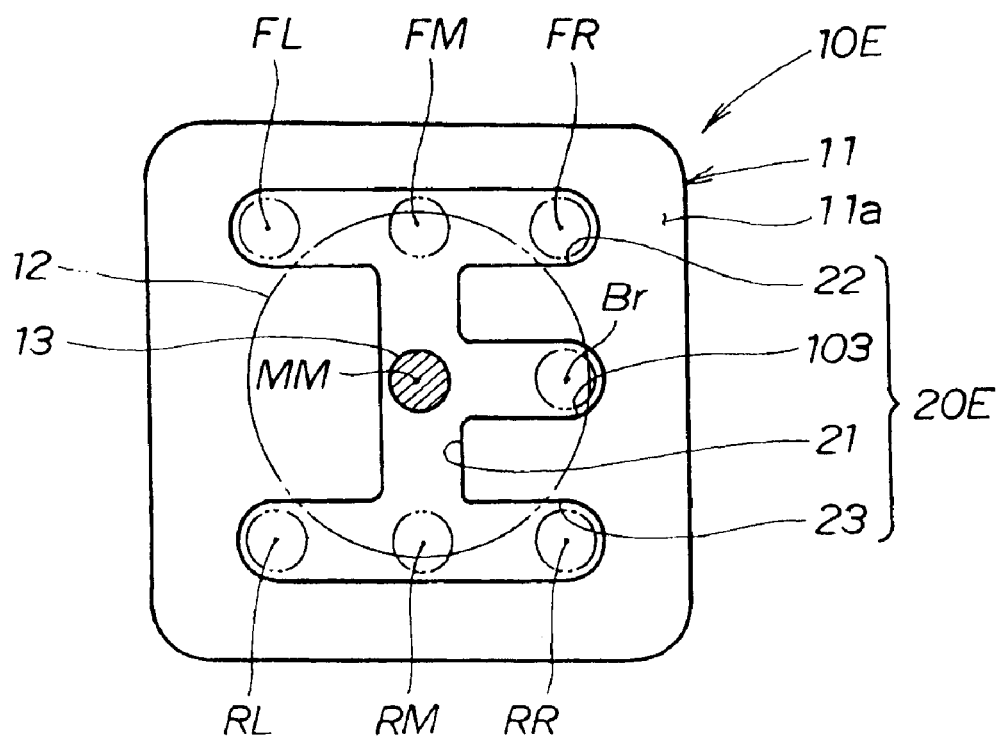
FIG. 13 is a plan view schematically illustrating the fifth modification of the vehicle window opening/closing switch apparatus shown in FIG. 2.

A window opening/closing switch apparatus 10E of the fifth modification shown in FIG. 13 is a modification of the window opening/closing switch apparatus 10 shown in FIGS. 1 through 8. A guiding groove 20E of the fifth modification has the same configuration as the roughly I-shaped guiding groove 20 shown in FIG. 2, with the addition of a divergent groove 103. The divergent groove 103 is a transverse groove that extends to the right from the middle position MM of the longitudinal groove 21. The first switch 14 (see FIG. 1) does not select anything when the operating shaft 13 is in the right end position Br of the divergent groove 103. In other words, the first switch 14 is off. Therefore, the operation of the second and third switches 15 and 16 (see FIG. 1) does not affect the action of the windows 56A through 56D (see FIG. 4).

Figure 14:
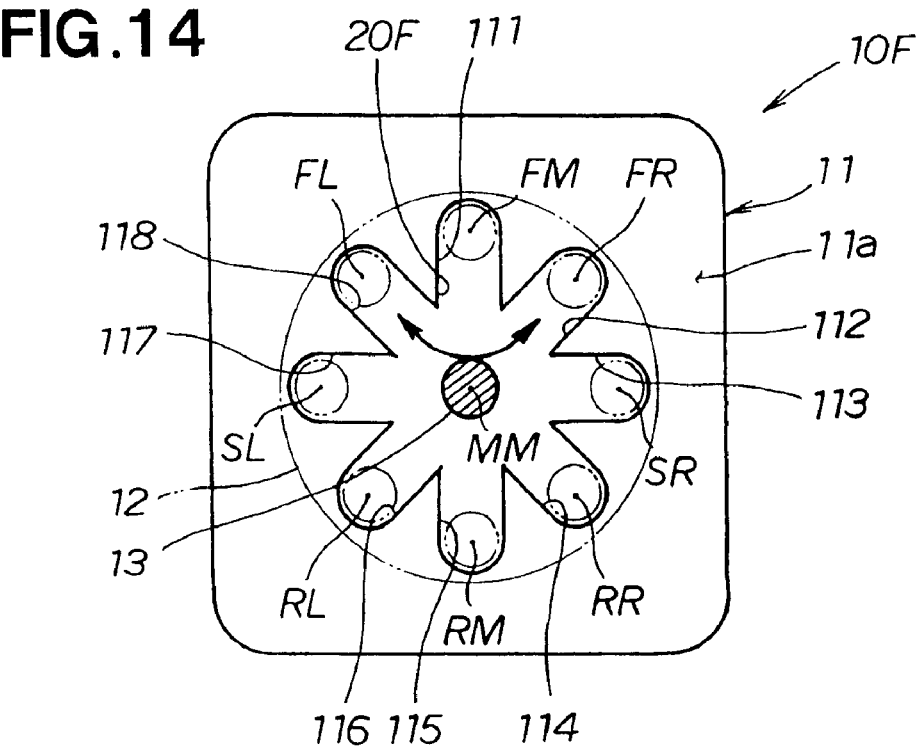
FIG. 14 is a plan view schematically illustrating the sixth modification of the vehicle window opening/closing switch apparatus shown in FIG. 2.

A window opening/closing switch apparatus 10F of the sixth modification shown in FIG. 14 is applied to a vehicle 50 comprising at least the four side doors 51A through 51D and the sunroof 53 shown in FIG. 4. The window opening/closing switch apparatus 10F of the sixth modification fulfills the role of the sunroof switch 71A shown in FIG. 8. A guiding groove 20F of the sixth modification is composed of eight long, thin grooves 111 through 118 extending in a radial pattern and centered around one point MM as a reference. The eight grooves 111 through 118 are arrayed at a regular pitch and are communicated with each other. The lengths of all of the grooves 111 through 118 are the same. The eight grooves 111 through 118 are defined as follows. The groove extending forward from the point MM is the first groove 111, followed by the second groove 112, third groove 113, fourth groove 114, fifth groove 115, sixth groove 116, seventh groove 117, and eighth groove 118, proceeding sequentially clockwise from the first groove.

The point MM is referred to as the middle position MM. The distal end position (front end position) of the first groove 111 is the front middle position FM. The distal end position of the second groove 112 is the front right position FR. The distal end position of the third groove 113 is the right end position SR. The distal end position of the fourth groove 114 is the rear right position RR. The distal end position (rear position) of the fifth groove 115 is the rear middle position RM. The distal end position of the sixth groove 116 is the rear left position RL. The distal end position of the seventh groove 117 is the left end position SL. The distal end position of the eighth groove 118 is the front left position FL.

Next, the relationship between the position of the knob 12 and operating shaft 13 and the action of the first switch 14 will be described with reference to FIGS. 1, 4, and 14. When the operating shaft 13 is in the middle position MM, the first switch 14 is off and does not make a selection. When the operating shaft 13 is in the front middle position FM, the first switch 14 selects the front left window 56A and the front right window 56B. When the operating shaft 13 is in the front left position FL, the first switch 14 selects the front left window 56A. When the operating shaft 13 is in the front right position FR, the first switch 14 selects the front right window 56B. When the operating shaft 13 is in the rear middle position RM, the first switch 14 selects the rear left window 56C and the rear right window 56D. When the operating shaft 13 is in the rear left position RL, the first switch 14 selects the rear left window 56C. When the operating shaft 13 is in the rear right position RR, the first switch 14 selects the rear right window 56D. When the operating shaft 13 is in the right end position SR, the first switch 14 selects the sunroof 53 (the window 53). When the operating shaft 13 is in the left end position SL, the first switch 14 selects all of the windows 56A through 56D and 53.

Thus, the guiding groove 20F is displaced to the left and right by displacing the operating shaft 13 between the front left position FL and front right position FR, for example, via the middle position MM. In other words, an arbitrary window can be selected from among the windows 56A through 56D and 53 by displacing the first switch 14 at least to the left and right.

Figure 15:
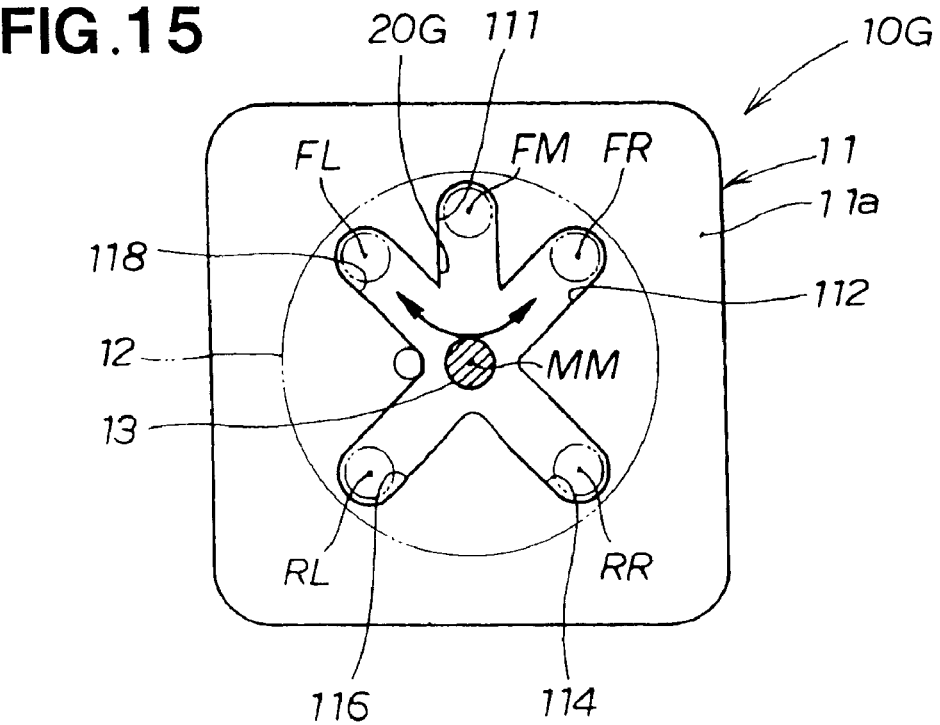
FIG. 15 is a plan view schematically illustrating the seventh modification of the vehicle window opening/closing switch apparatus shown in FIG. 2.

A window opening/closing switch apparatus 10G of the seventh modification shown in FIG. 15 is a further modification of the sixth modification shown in FIG. 14. Specifically, a guiding groove 20G of the seventh modification is the same as the guiding groove 20F of the sixth modification, except for the absence of the third groove 113, fifth groove 115, and seventh groove 117. When the operating shaft 13 is in the middle position MM, the first switch 14 (see FIG. 1) selects all four of the windows 56A through 56D.

Figure 16:
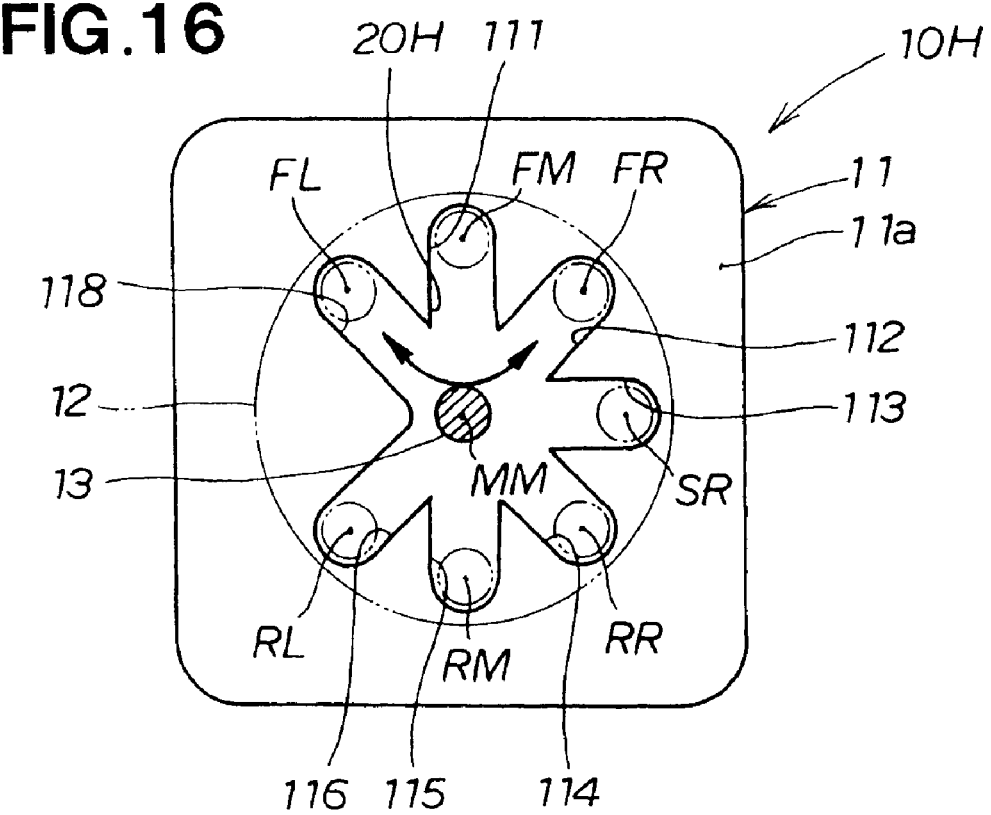
FIG. 16 is a plan view schematically illustrating the eighth modification of the vehicle window opening/closing switch apparatus shown in FIG. 2.

A window opening/closing switch apparatus 10H of the eighth modification shown in FIG. 16 is a further modification of the sixth modification shown in FIG. 14. Specifically, a guiding groove 20H of the eighth modification is the same as the guiding groove 20F of the sixth modification, except for the absence of the seventh groove 117. When the operating shaft 13 is in the middle position MM, the first switch 14 (see FIG. 1) selects all four of the windows 56A through 56D.

Discussion will be made next as to first and second modifications of the second switch 15 with reference to FIGS. 17 and 18. Like or same reference numerals will be used for parts or elements corresponding to those of the second switch 15 shown in FIG. 6 and their description will be omitted.

Figure 17:
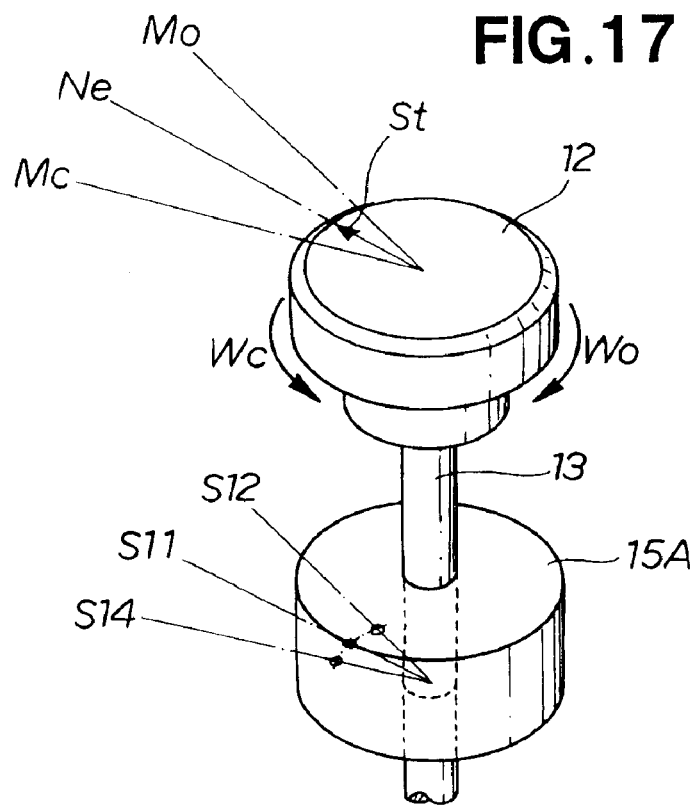
FIG. 17 is a schematic perspective view illustrating a first modification of the second switch shown in FIG. 6.

Second switch 15A of the first modification shown in FIG. 17 has a neutral rotation part S11, an opening adjustment part S12 for opening the window (window-opening-degree adjustment part) and an opening adjustment part S14 for closing the window (window-closing-degree adjustment part). Namely, the second switch 15A differs from the second switch 15 shown in FIG. 6 in that it is devoid of the automatic fully opening part S13 and the automatic fully closing part S15. It is desirable that the second switch 15A of the first modification be used on combination with the third switch 16 (see FIG. 7). The degree of opening of the window selected by the first switch 14 (FIG. 1) may be adjusted arbitrarily by the second switch 15A. Also, the window selected by the first switch 14 may be placed into the fully open position or fully closed position by the third switch 16.

Figure 18:
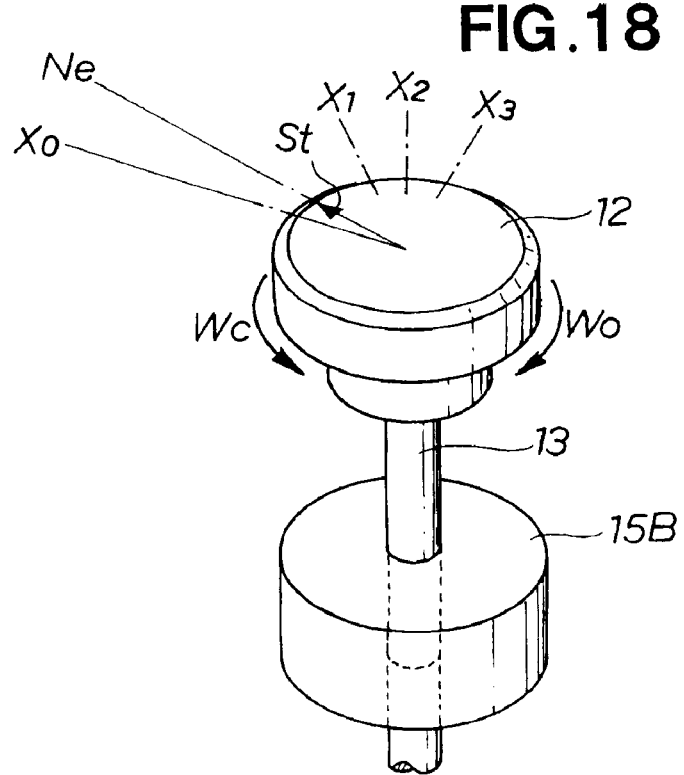
FIG. 18 is a schematic perspective view illustrating a second modification of the second switch shown in FIG. 6.

Second switch 15B of the second modification shown in FIG. 18 comprises a potentiometer that operates in response to a rotational operation of the knob 12. The second switch 15B may comprise, in place of the potentiometer, a multiplicity of contacts arranged to be slightly spaced from each other. For operation, the knob 12 of the second modification is capable of being turned in a clockwise direction, as shown by arrow Wo, from the illustrated position where the reference mark St lies on the neutral rotational position Ne, up to the terminal end Xo. The terminal end may be disposed at a desired rotational position. When the reference mark St coincides with the neutral rotational position Ne, the degree of window opening is 0% (fully closed state). As the knob 12 is turned in the clockwise direction Wo, the degree of opening of the window increases in proportionate to the angle of rotation of the knob 12. As the knob 12 is turned up until the terminal end Xo, the degree of opening of the window is 100% sully opened state). As the knob 12 is turned in a counterclockwise direction Wc, the degree of opening the window decreases in proportionate to the angle of rotation of the knob 12.

The second switch 15B of the second modification may include a plurality of rotational positions set between the neutral rotational position Ne and the terminal end Xo. Then, clique mechanisms similar in construction to those shown in FIG. 5 may be provided at the set rotational positions so that a clear click sound and a clear sense of operation are provided upon arrival of the knob 12 at each of the rotational positions. Indicators capable of indicating a degree (value) of window opening corresponding to the respective rotational positions may be provided additionally. The rotational positions may be equidistantly spaced from each other. Although the second modification shown in FIG. 18 has been described to have three rotational positions X1 to X3, the number is not limited to those three and more rotational positions may be provided.

In the present invention, the structure for incorporating the second and third switches 15 and 16 in the first switch 14 can be any appropriate configuration, and is not limited to a configuration based on the switch-incorporating unit 17.

The first, second, and third switches 14 through 16 are not limited to contact switches that have contact points, and may also be non-contact switches that do not have contact points.

Alternatively, the second switches 15, 15A, 15B may be arranged such that they generate a window-closing signal when the knob 12 is turned in a clockwise direction Wo and a window-opening signal when the knob 12 is turned in a counterclockwise direction Wc.

The second switches 15, 15A, 15B should not be limited to a rotary switch.

The third switch 16 is not limited to a push-pull switch.

The vehicle window opening/closing switch apparatuses 10 and 10A through 10H of the present invention are suitable for use in various passenger vehicles.

Obviously, various minor changes and modifications of the present invention are possible in light of the above teaching. It is therefore to be understood that within the scope of the appended claims the invention may be practiced otherwise than as specifically described.

What is claimed is:

1. A vehicle window opening/closing switch apparatus for opening/closing a plurality of windows provided on a vehicle, the apparatus comprising:

a first switch adapted to be manually operated to be displaced to at least right and left to thereby electrically select, from among the plurality of windows, one or more arbitrary windows; and a second switch incorporated with the first switch and adapted to be manually operated to cause the selected window or windows to be electrically opened and closed.

2. The switch apparatus of claim 1, wherein the first switch comprises:

individual designators capable of being switched to select the one arbitrary window from among the windows; and multiple designators capable of being switched to select the more-than-one arbitrary windows from among the windows.

3. The switch apparatus of claim 2, wherein the individual designators are equal in number to the windows.

4. The switch apparatus of claim 2, further comprising indicators corresponding to at least the individual designators.

5. The switch apparatus of claim 1, wherein the second switch comprises:

opening adjustment parts capable of being switched to arbitrarily adjust the amount by which one of the selected windows is opened;

an automatic fully opening part capable of being switched to automatically move one of the selected windows to a fully open position; and an automatic fully closing part capable of being switched to automatically move one of the selected windows to a fully closed position.

6. The switch apparatus of claim 1, further comprising a third switch assembled with the first switch and adapted to cause the selected windows to be electrically opened and closed by a manual operation in a direction opposite from directions of the manual operation of the first and second switches, wherein the third switch has at least one of an automatic fully opening part and an automatic fully closing part, the automatic fully opening part being designed to be switched to automatically move one of the selected windows to a fully open position, the automatic fully closing part being designed to be switched to automatically move the one of the selected windows to a fully closed position, and the second switch has opening adjustment parts capable of being switched to arbitrarily adjust the amount by which the one of the selected windows is opened.

7. The switch apparatus of claim 1, further comprising additional switches electrically independent of the first and second switches at positions adjacent to the first and second switches, wherein the additional switches are configured to operate vehicle load structures other than the windows.

* * * * *

UNITED STATES PATENT AND TRADEMARK OFFICE
CERTIFICATE OF CORRECTION

| | |
|---|---|
| PATENT NO. | : 7,439,460 B1 |
| APPLICATION NO. | : 11/850241 |
| DATED | : October 21, 2008 |
| INVENTOR(S) | : Stephen Watson |

Page 1 of 1

It is certified that error appears in the above-identified patent and that said Letters Patent is hereby corrected as shown below:

On the title page, item 30, Foreign Application Priority Data, Insert --July 31, 2007 EPO 07015034.7--.

Signed and Sealed this

Twenty-seventh Day of January, 2009

JOHN DOLL
*Acting Director of the United States Patent and Trademark Office*